(12) United States Patent
Wang

(10) Patent No.: US 12,335,841 B2
(45) Date of Patent: Jun. 17, 2025

(54) CONNECTION ESTABLISHMENT AND BEARER MAPPING FOR UE-TO-NETWORK RELAY

(71) Applicant: MediaTek Singapore Pte. Ltd., Singapore (SG)

(72) Inventor: Xuelong Wang, Beijing (CN)

(73) Assignee: MediaTek Singapore Pte. Ltd, Singapore (SG)

( * ) Notice: Subject to any disclaimer, the term of this patent is extended or adjusted under 35 U.S.C. 154(b) by 421 days.

(21) Appl. No.: 17/827,976

(22) Filed: May 30, 2022

(65) Prior Publication Data

US 2022/0295375 A1    Sep. 15, 2022

Related U.S. Application Data

(63) Continuation of application No. PCT/CN2021/070773, filed on Jan. 8, 2021, which is
(Continued)

(30) Foreign Application Priority Data

Jan. 10, 2020 (WO) ................ PCT/CN2020/071377
Jan. 8, 2021 (WO) ................ PCT/CN2021/070773

(51) Int. Cl.
*H04W 40/22* (2009.01)
*H04W 76/14* (2018.01)
*H04W 88/06* (2009.01)

(52) U.S. Cl.
CPC ........... *H04W 40/22* (2013.01); *H04W 76/14* (2018.02); *H04W 88/06* (2013.01)

(58) Field of Classification Search
CPC ..... H04W 40/22; H04W 76/14; H04W 88/06; H04W 92/10; H04W 92/18; H04W 76/12;
(Continued)

(56) References Cited

U.S. PATENT DOCUMENTS

2017/0071028 A1*  3/2017  Kuo et al. ........... H04W 76/062
2017/0086114 A1*  3/2017  Jung et al. ............ H04W 36/08
(Continued)

FOREIGN PATENT DOCUMENTS

CN     108029148 A    7/2015
CN     111586765 A    2/2019
(Continued)

OTHER PUBLICATIONS

CN 109729566 A) >>> The Invention Claims An Information Transmission Method And Device (see title) (Year: 2019).*
(Continued)

*Primary Examiner* — Meless N Zewdu
(74) *Attorney, Agent, or Firm* — Helen Mao; Imperium Patent Works

(57) ABSTRACT

Apparatus and methods are provided for connection establishment and bearer mapping for L2-based sidelink UE-to-Network relay. In one novel aspect, the connection establishment is triggered by a Uu RRC message or a PC5 RRC message of the Sidelink Relay Channel Configuration Request. In one embodiment, the establishing of one or more sidelink relay channels is triggered by a resource control (RRC) message of Sidelink Relay Channel Configuration Request. In one embodiment, the relay UE sends a PC5 RRC message of Sidelink Relay Channel Configuration Request to the remote UE based on a Uu RRC message from the gNB. In another embodiment, the relay UE sends a sidelink UE information (SUI) to the gNB with UE information for the relay and remote UEs. In another embodiment, the bearer mapping is based on a mapping between a relay channel ID and a Uu bearer ID of a mapped relay radio bearer.

17 Claims, 8 Drawing Sheets

Related U.S. Application Data a continuation of application No. PCT/CN2020/071377, filed on Jan. 10, 2020.

(58) Field of Classification Search
CPC ..... H04W 88/04; H04W 72/25; H04W 72/40; H04W 72/232; H04W 72/231; H04W 72/1263; H04W 72/1268; H04W 72/1273; H04W 72/20; H04W 4/50; H04W 28/0875; H04W 76/23; H04W 84/20; H04W 36/03; H04W 76/00; H04W 76/10; H04W 76/11; H04W 76/27; H04W 76/15; H04B 7/26; H04B 7/026; H04B 7/02; H04B 7/14; H04B 7/15; H04B 7/15528; H04B 7/15592; H04B 7/024
See application file for complete search history.

(56) References Cited

U.S. PATENT DOCUMENTS

| | | | |
|---|---|---|---|
| 2018/0054755 A1* | 2/2018 | Lee et al. | H04W 28/0278 |
| 2018/0077618 A1* | 3/2018 | Lee et al. | H04W 36/06 |
| 2018/0324571 A1* | 11/2018 | Buckley et al. | H04W 4/90 |
| 2018/0324848 A1* | 11/2018 | Baghel et al. | H04W 72/14 |
| 2018/0324882 A1* | 11/2018 | Gulati et al. | H04W 76/14 |
| 2019/0045574 A1* | 2/2019 | Feng | H04W 76/27 |
| 2019/0261450 A1* | 8/2019 | Adachi et al. | H04W 80/02 |
| 2020/0196387 A1* | 6/2020 | Roy et al. | H04W 88/04 |
| 2020/0288535 A1* | 9/2020 | Sharma et al. | H04W 88/04 |

FOREIGN PATENT DOCUMENTS

| | | | | |
|---|---|---|---|---|
| WO | WO 2011020409 A1 * | 2/2011 | | H04W 72/04 |
| WO | WO 2016161764 A1 * | 10/2016 | | H04W 4/00 |
| WO | WO 2016184347 A1 * | 11/2016 | | H04W 8/26 |
| WO | WO 2018028504 A1 * | 2/2018 | | H04W 76/02 |

OTHER PUBLICATIONS

CN 108029148 A) >>> Layer 2 Relay Protocol And The Mobility Relay Method (see title) (Year: 2018).*
International Search Report and Written Opinion of International Search Authority for PCT/CN2021/070873 dated Mar. 29, 2021 (9 pages).
China Intellectual Property Office Action notice of allowance 202180007019.7, dated Aug. 19, 2024.

* cited by examiner ical Field

CONNECTION ESTABLISHMENT AND BEARER MAPPING FOR UE-TO-NETWORK RELAY

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2021/070773, titled "Methods and Apparatus of Connection Establishing and Bearer mapping for UE-to-Network Relay," with an international filing date of Jan. 8, 2021. International Application No. PCT/CN2021/070773 in turn, claims priority under 35 U.S.C. § 120 and § 365(c) from International Application No. PCT/CN2020/071377, titled "Methods and Apparatus of Connection Establishing and Bearer mapping for UE-to-Network Relay," with an international filing date of Jan. 10, 2020. This application is a continuation of International Application No. PCT/CN2021/070773. International Application No. PCT/CN2021/070773 is pending as of the filing date of this application, and the United States is an elected state in International Application No. PCT/CN2021/070773. The disclosure of each of the foregoing documents is incorporated herein by reference.

TECHNICAL FIELD

The disclosed embodiments relate generally to wireless communication, and, more particularly, to connection establishment and bearer mapping for UE-to-Network relay.

BACKGROUND 5G radio access technology will be a key component of the modern access network. It will address high traffic growth and increasing demand for high-bandwidth connectivity. Wireless relay in cellular networks provides extended coverage and improved transmission reliability. Long term evolution (LTE) network introduced 3GPP sidelink, the direct communication between two user equipment (UEs) without signal relay through a base station. In 3GPP New Radio (NR), sidelink continues evolving. With new functionalities supported, the sidelink offers low latency, high reliability and high throughout for device to device communications. Using sidelink for wireless relay provides a reliable and efficient way for traffic forwarding. For the early sidelink-based wireless relay services, such as the ProSe UE-to-Network relay, the traffic between the remote UE and the base station is forwarded at the IP layer by the relay UE. The relay operation was specified for LTE aiming at coverage expansion from the perspective of Layer-3 (L3) relay. The Layer-2 (L2) based relay using sidelink can improve the efficiency and flexibility. The current ProSe UE-to-Network relay and the PC5 signaling protocol uses the legacy connection establishment for the sidelink relay. The access stratum (AS) layer connection establishment is not addressed for the L2-based sidelink relay connection establishment. Further, bearer mapping for the UE-to-Network sidelink relay, including multi-hop sidelink relay are not defined.

Improvements and enhancements are required for connection establishment and bearer for mapping L2-based sidelink relay.

SUMMARY

Apparatus and methods are provided for connection establishment and bearer mapping for L2-based sidelink UE-to-Network relay. In one novel aspect, the connection establishment is triggered by a Uu RRC message or a PC5 RRC message of the Sidelink Relay Channel Configuration Request. In one embodiment, the relay UE configures a L2-based sidelink relay path between the remote UE and the gNB in a NR wireless network with one or more relay nodes, establishes one or more sidelink relay channels with the remote UE by the relay UE, activates an end-to-end sidelink relay data channel based on the configured L2-based SL relay path, and performs bearer mappings for traffic forwarding between the remote UE and the gNB based on the configured L2-based SL relay path. In one embodiment, the establishing of one or more sidelink relay channels is triggered by a Uu radio resource control (RRC) message of Sidelink Relay Channel Configuration Request from the gNB. In another embodiment, the Sidelink Relay Channel Configuration Request message configures a direct PC5 link between the relay UE and the remote UE. In yet another embodiment, the Sidelink Relay Channel Configuration Request message configures a direct PC5 link between the relay UE and the remote UE and a Uu radio bearer configuration for indirect link between the gNB and the remote UE. In one embodiment, the relay UE sends a PC5 RRC message of Sidelink Relay Channel Configuration Request to the remote UE based on the Uu RRC message from the gNB. In another embodiment, the relay UE sends a sidelink UE information (SUI) to the gNB with UE information for both the relay UE and the remote UE. In yet another embodiment, the bearer mapping is based on a mapping between a relay channel ID and a Uu bearer ID of a mapped relay radio bearer. In one embodiment, the relay UE establishes a first sidelink with the remote UE and a second sidelink with a second relay UE, and wherein the relay UE maps its ingress relay channel between the remote UE and the second relay UE to its egress relay channel between the relay UE and the second relay UE. In one embodiment, the establishing of the sidelink for the remote UE is triggered by a Uu radio resource control (RRC) message of Sidelink Relay Channel Configuration Request from the gNB. In another embodiment, the establishing of the sidelink for the remote UE is triggered by a PC5 RRC message of Sidelink Relay Channel Configuration Request from the relay UE. In yet another embodiment, the remote UE establishes a Uu direct link with the gNB, and wherein a radio bearer switch message is received from the gNB to switch from the Uu direct link with the gNB to an end-to-end sidelink relay bearer. In one embodiment, the bearer mapping for the remote UE is based on a mapping relation between an end-to-end Uu bearer ID with the gNB and a relay channel ID with the relay UE.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
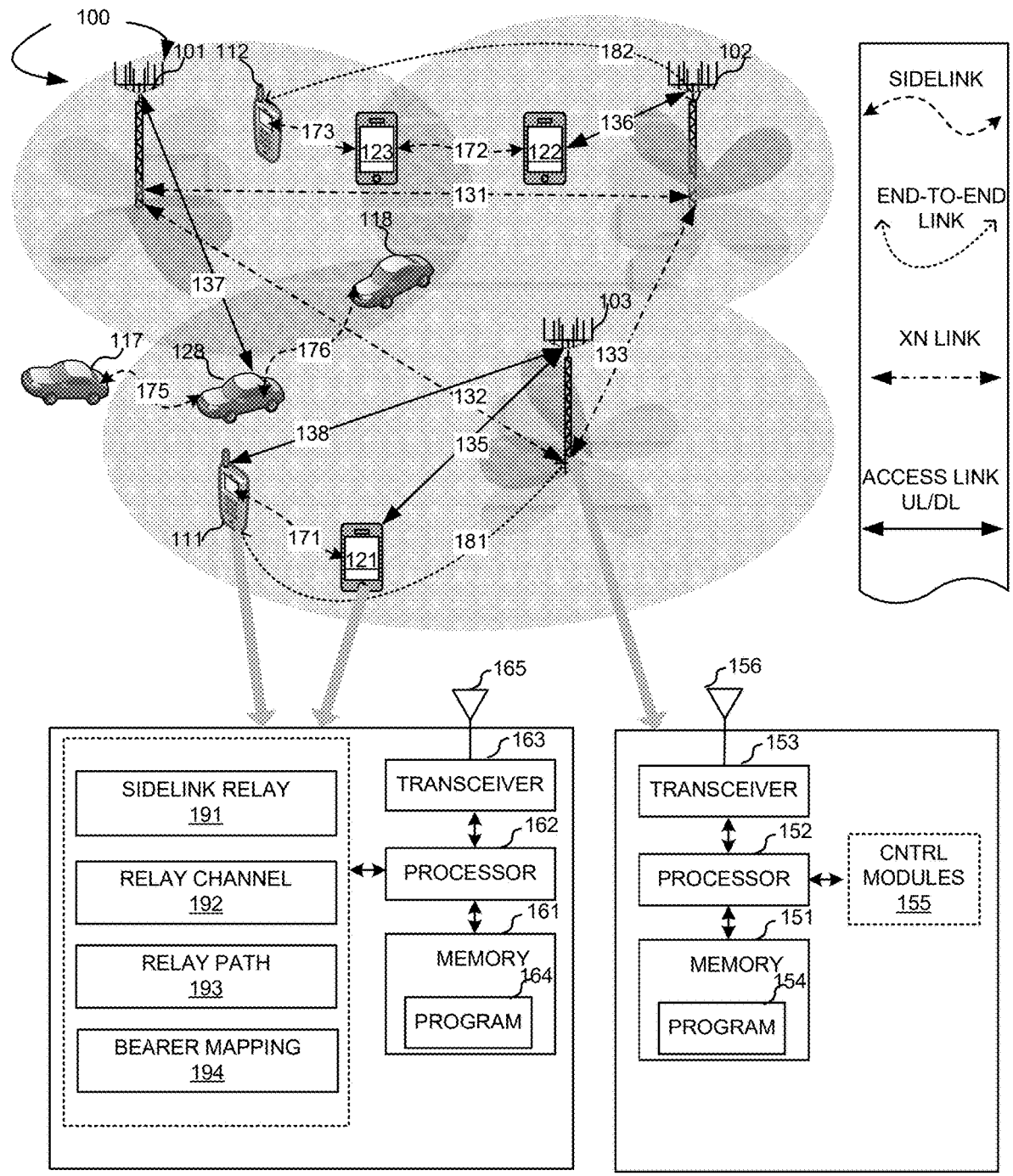
FIG. 1 is a schematic system diagram illustrating an exemplary NR wireless network for connection establishment and bearer mapping for L2-based sidelink relay in accordance with embodiments of the current invention.

FIG. 1 is a schematic system diagram illustrating an exemplary NR wireless network for connection establishment and bearer mapping for L2-based sidelink relay in accordance with embodiments of the current invention. NR wireless system 100 includes one or more fixed base infrastructure units forming a network distributed over a geographical region. The base unit may also be referred to as an access point, an access terminal, a base station, a Node-B, an eNode-B (eNB), a gNB, or by other terminology used in the art. The network can be homogeneous network or heterogeneous network, which can be deployed with the same frequency or different frequency. gNB 101, gNB 102 and gNB 103 are base stations in the NR network, the serving area of which may or may not overlap with each other. Backhaul connections such as 131, 132, and 133, connect the non-co-located receiving base units, such as gNB 101, 102 and 103. These backhaul connections can be either ideal or non-ideal. gNB 101 connects with gNB 102 via Xnr interface 131 and connects with gNB 103 via Xnr interface 132. gNB 102 connects with gNB 103 via Xnr interface 133.

NR wireless network 100 also includes multiple communication devices or mobile stations, such user equipments (UEs) such as UEs 111, 112, 113, 117, 118, 121, 122, 123, and 128. Communication devices or mobile stations in NR wireless network 100 may also refers to devices with wireless connectivity in a vehicle, such as mobile devices 118, 117 and 128. The exemplary mobile devices in wireless network 100 have sidelink capabilities. The mobile devices can establish one or more connections with one or more base stations, such as gNB 101, 102, and 103. The mobile device, such as mobile device 117, may also be out of connection with the base stations with its access links but can transmit and receive data packets with another one or more other mobile stations or with one or more base stations through L2-based sidelink relay.

In one novel aspect, data packets are forwarded by one or more relay UEs based on information in L2 header. A remote UE 111 and gNB 103 forms an end-to-end path 181 through a L2-based sidelink relay with a relay UE 121. End-to-end path 181 includes an access link 135 between gNB 103 and relay UE 121 and a sidelink 171 between remote UE 111 and relay UE 121. In one embodiment, the remote UE 111 also has a direct access link 138 with gNB 103. In other embodiments, the L2-based sidelink relay is a multi-hop relay with multiple relay UEs. A remote UE 112 and gNB 102 forms an end-to-end path 182 through a L2-based sidelink relay with a relay UE 122 and another relay UE 123. End-to-end path 182 includes an access link 136 between gNB 102 and relay UE 122, sidelink 172 between relay UE 122 and relay UE 123, and sidelink 173 between remote UE 112 and relay UE 123. In yet another embodiment, a relay mobile device is configured with multiple remote mobile devices or multiple end node mobile devices. A relay UE 128, with an access link 137 to gNB 101 is configured with two remote UEs 117 and 118 through sidelink 175 and 176, respectively. In one embodiment, the UE-to-Network L2-based sidelink relay includes one or more remote UEs being the out-of-coverage UEs, such as remote UE 117. Different links are established for the illustrated relay paths. An access link is a link between a base station, such as gNB and a mobile device, such as a UE. The UE can be a remote UE or a relay UE. The access link includes both the uplink (UL) and the downlink (DL) between the base station and the mobile device. The interface for the access link is an NR Uu interface. In one embodiment, the remote UE also establishes access link with a base station, such as remote UE 111 establishes the access link 138 with gNB 103. A sidelink is a link between two mobile devices and uses PC5 interface. The sidelink can be a link between a remote UE/end-node UE and a relay UE or a link between two relay mobile devices/UEs for the multi-hop relay. The end-to-end link for a relay path can be a link between two end-node mobile devices for a UE-to-UE relay or a base station to mobile device for a UE-to-Network relay. An Xn link is the backhaul link between two base stations, such gNBs using the Xn interface. In one embodiment, candidate relay UE information is transmitted to the base station via the Xn link.

FIG. 1 further illustrates simplified block diagrams of a base station and a mobile device/UE for adaptation handling for L2-based sidelink relay. gNB 103 has an antenna 156, which transmits and receives radio signals. An RF transceiver circuit 153, coupled with the antenna, receives RF signals from antenna 156, converts them to baseband signals, and sends them to processor 152. RF transceiver 153 also converts received baseband signals from processor 152, converts them to RF signals, and sends out to antenna 156. Processor 152 processes the received baseband signals and invokes different functional modules to perform features in gNB 103. Memory 151 stores program instructions and data 154 to control the operations of gNB 103. gNB 103 also includes a set of control modules 155 that carry out functional tasks to communicate with mobile stations.

FIG. 1 also includes simplified block diagrams of a UE, such as relay UE 121 or remote UE 111. The UE has an antenna 165, which transmits and receives radio signals. An RF transceiver circuit 163, coupled with the antenna, receives RF signals from antenna 165, converts them to baseband signals, and sends them to processor 162. In one embodiment, the RF transceiver may comprise two RF modules (not shown). A first RF module is used for HF transmitting and receiving, and the other RF module is used for different frequency bands transmitting and receiving which is different from the HF transceiver. RF transceiver 163 also converts received baseband signals from processor 162, converts them to RF signals, and sends out to antenna 165. Processor 162 processes the received baseband signals and invokes different functional modules to perform features in THE UE. Memory 161 stores program instructions and data 164 to control the operations of the UE. Antenna 165 sends uplink transmission and receives downlink transmissions to/from antenna 156 of gNB 103.

The UE also includes a set of control modules that carry out functional tasks. These control modules can be implemented by circuits, software, firmware, or a combination of them. A sidelink relay circuit 191 configures a layer-2 (L2)-based sidelink (SL) relay path between a remote UE and a gNB in the NR wireless network, wherein the L2-based relay path includes one or more relay nodes. A relay channel circuit 192 establishes one or more sidelink relay channels based on the L2-based SL relay path. A relay path circuit 193 activates an end-to-end sidelink relay data channel based on the configured L2-based SL relay path. A bearer mapping circuit 194 performs bearer mappings for traffic forwarding between the remote UE and the gNB based on the configured L2-based SL relay path.

Figure 2:
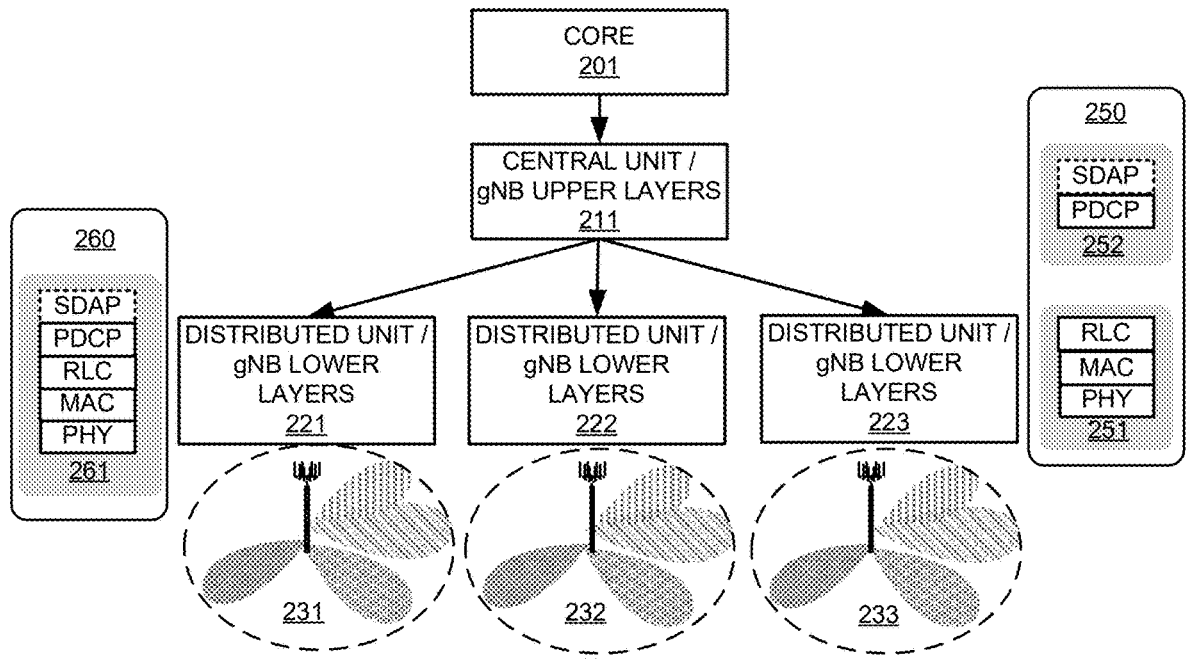
FIG. 2 illustrates an exemplary NR wireless system with centralized upper layers of the NR radio interface stacks in accordance with embodiments of the current invention.

FIG. 2 illustrates an exemplary NR wireless system with centralized upper layers of the NR radio interface stacks in accordance with embodiments of the current invention. Different protocol split options between central unit (CU) and distributed unit (DU) of gNB nodes may be possible. The functional split between the CU and DU of gNB nodes may depend on the transport layer. Low performance transport between the CU and DU of gNB nodes can enable the higher protocol layers of the NR radio stacks to be supported in the CU, since the higher protocol layers have lower performance requirements on the transport layer in terms of bandwidth, delay, synchronization and jitter. In one embodiment, SDAP and PDCP layer are located in the CU, while RLC, MAC and PHY layers are located in the DU. A core unit 201 is connected with one central unit 211 with gNB upper layer 252. In one embodiment 250, gNB upper layer 252 includes the PDCP layer and optionally the SDAP layer. Central unit 211 connects with distributed units 221, 222, and 221. Distributed units 221, 222, and 223 each corresponds to a cell 231, 232, and 233, respectively. The DUs, such as 221, 222 and 223 includes gNB lower layers 251. In one embodiment, gNB lower layers 251 include the PHY, MAC and the RLC layers. In another embodiment 260, each gNB has the protocol stacks 261 including SDAP, PDCP, RLC, MAC and PHY layers.

Figure 3:
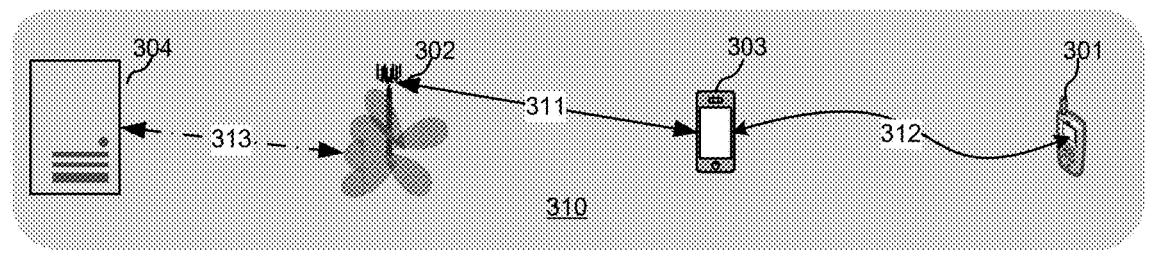
FIG. 3 illustrates exemplary diagrams NR wireless network with an integration of relay UE between the base station and the remote UE for L2-based sidelink relay in accordance with embodiments of the current invention.
Figure 3:
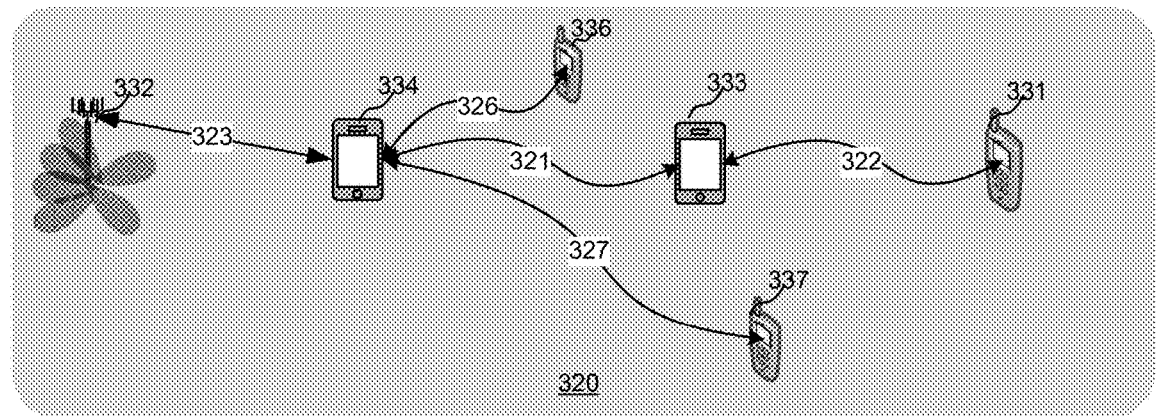

FIG. 3 illustrates exemplary diagrams NR wireless network with an integration of relay UE between the base station and the remote UE for L2-based sidelink relay in accordance with embodiments of the current invention. Diagram 310 illustrates a one-hop UE-to-Network relay for traffic forwarding. A remote UE 301 established a relay path with a gNB 302 through a relay UE 303. Relay UE 303 communicates with gNB 302 via access link 313. Relay UE 303 communicates with remote UE 301 through sidelink 312. The sidelink is 3GPP specified radio link that enables V2X applications. gNB 302 transmits data packets destined to remote UE 301 through DL to relay UE 303 and receives data packets from remote UE 301 through UL from relay UE 303. The data path between remote UE 301 and gNB 302 includes access link 311 and sidelink 312. In a NR network, gNB 302 connects with network entity 304 via S1 link 313. In other embodiments, remote UE 301 also has an access link with gNB 302. Upon the L2-based sidelink relay path established, the traffic is transferred to the established sidelink relay path.

In other embodiments, illustrated in diagram 320, the sidelink relay path is a multi-hop path. Diagram 320 also illustrates sidelink relay in groupcast or broadcast mode. A remote UE 331 established a data path with a gNB 332 through relay UEs 333 and 334. Relay UE 333 communicates with gNB 332 via access link 323. Relay UE 333 communicates with relay UE 334 through sidelink 321. Relay UE 334 communicates with remote UE 331 through sidelink 322. gNB 332 transmits data packets destined to remote UE 331 through DL to relay UEs 334, which is forwarded to relay UE 333 through sidelink 321. gNB 332 receives data packets from remote UE 331 through UL from relay UE 334, which is forwarded from relay 333 through sidelink 322. The relay path between remote UE 331 and gNB 332 includes access link 323 and sidelink 321 and 322. Multi-hop relay can be configured with two or more relay UEs. In one embodiment, the one or more relay UEs and the remote UE/end-node UE connect with base stations. In another embodiment, the remote UE may be out of range and is not connected with any base station. In yet other embodiments, the one or more relay UEs and the remote UE are connected with different gNBs. In other multi-hop relay configurations, the combination of connection status of the relay UEs and the end-node UEs are possible as described above. Diagram 320 also illustrates a relay UE is configured with multiple remote UEs and data packet being forwarded by each remote UE based on predefined rules. Relay UE 334 connects with remote UE 336 via sidelink 326. Relay UE 334 connects with remote UE 337 with sidelink 327. In one embodiment, the relay UE, such as UE 334, aggregates multiple SIBx into a single sidelink PC5 broadcast or group cast. Relay UE 334 groups SIBx for multiple remote UEs, such as UE 331, 336 and 337 in a PC5-RRC broadcast or groupcast/broadcast message.

Figure 4A:
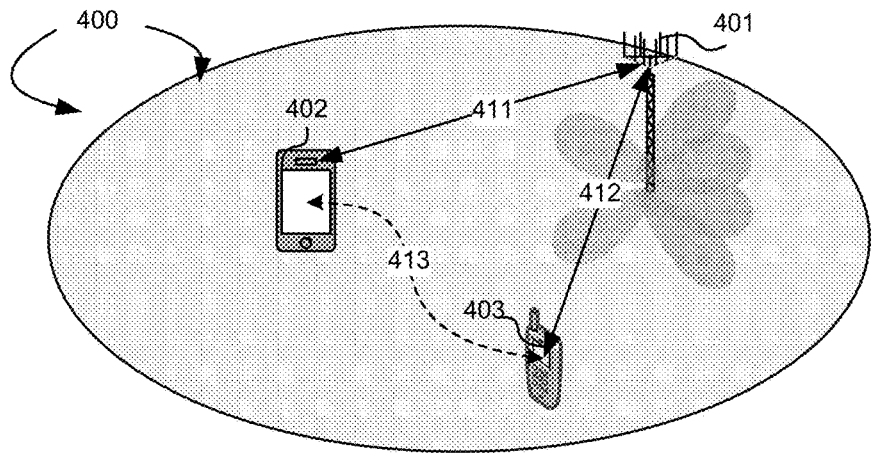
FIG. 4A illustrates exemplary diagrams for NR UE-to-Network relay with both the relay UE and the Remote UE connected with the network in accordance with embodiments of the current invention.
Figure 4B:
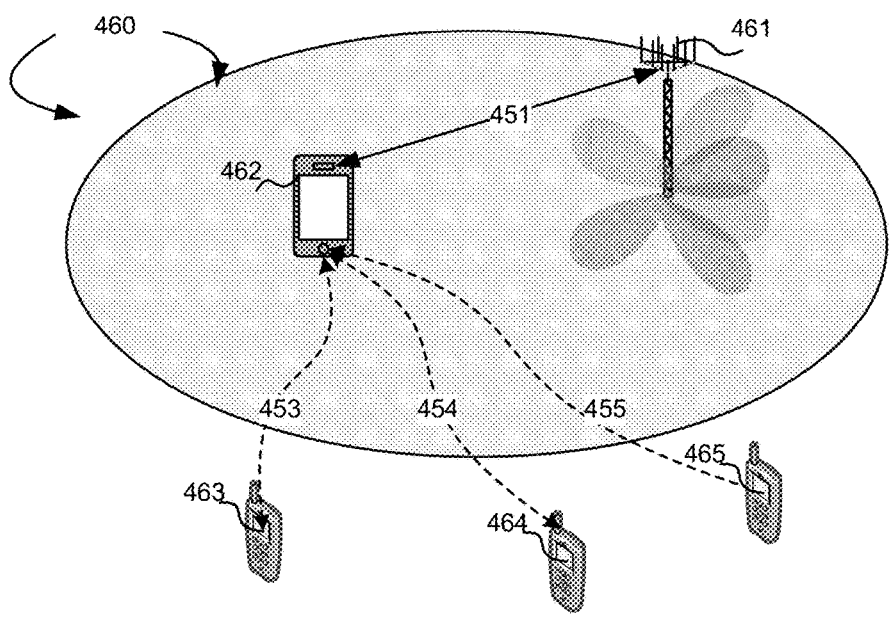
FIG. 4B illustrates exemplary diagrams for NR UE-to-Network relay with only the relay UE connected with the network in accordance with embodiments of the current invention.

In one novel aspect, the UE-to-network relay path is established with sidelink establishment and end-to-end resource block activation. In one embodiment, the remote UE has an access link with the gNB. The sidelink establishment is triggered by the Uu interface messages directly from the network. In another embodiment, the remote UE does not have the access link with the gNB. The sidelink establishment for the remote UE is triggered by the PC5 radio resource control (RRC) message from the relay UE. FIG. 4A and FIG. 4B illustrate the different embodiments for the connection establishment of the L2-based sidelink relay.

FIG. 4A illustrates exemplary diagrams for NR UE-to-network relay with both of the relay UE and the remote UE connected with the network in accordance with embodiments of the current invention. In one embodiment, the remote UE connects with the network directly through a Uu interface access link. An exemplary NR wireless network 400 includes a gNB 401, a remote UE 403 and a relay UE 402. Relay UE 402 has an access link 411 with gNB 401. Remote UE 403 has an access link 412 with gNB 401. Remote UE 403 and relay UE 402 indicates establishing relay channel interests to the network. Remote UE 403 and relay UE 402 upon finishing discovery for sidelink connection, performs sidelink establishments and establishes sidelink 413. In one embodiment, remote UE 403 has the access link with gNB 401. Remote UE 403 triggers the sidelink establishment based on a Uu interface RRC received from gNB 401. Upon establishing the end-to-end relay path, the data path between remote UE 403 and gNB 401 is switched to the established end-to-end L2 sidelink relay.

FIG. 4B illustrates exemplary diagrams for NR UE-to-network relay with only the relay UE connected with the network in accordance with embodiments of the current invention. In another embodiment, the UE-to-network L2-based sidelink relay is established for a remote UE that is not connected with the gNB. An exemplary NR wireless network 460 includes a gNB 461, a relay UE 462, and remote UEs 463, 464, and 465. Relay UE 462 has an access link 451 with gNB 401. Remote UEs 463, 464, and 465 are not connected with the network. In one embodiment, the base station sends sidelink configurations to the relay UE. The relay UE sends the sidelink establishment message to the corresponding remote UE that is not connected with the network. Remote UE 463 and relay UE 462 upon finishing discovery for sidelink connection, performs sidelink establishments. Remote UE 463 triggers the sidelink establishment based on PC5 RRC received from relay UE 462. Similarly, remote UEs 464 and 465 establishes sidelink channels with relay UE 462 based on corresponding PC5 RRC message received from relay UE 462.

Figure 5:
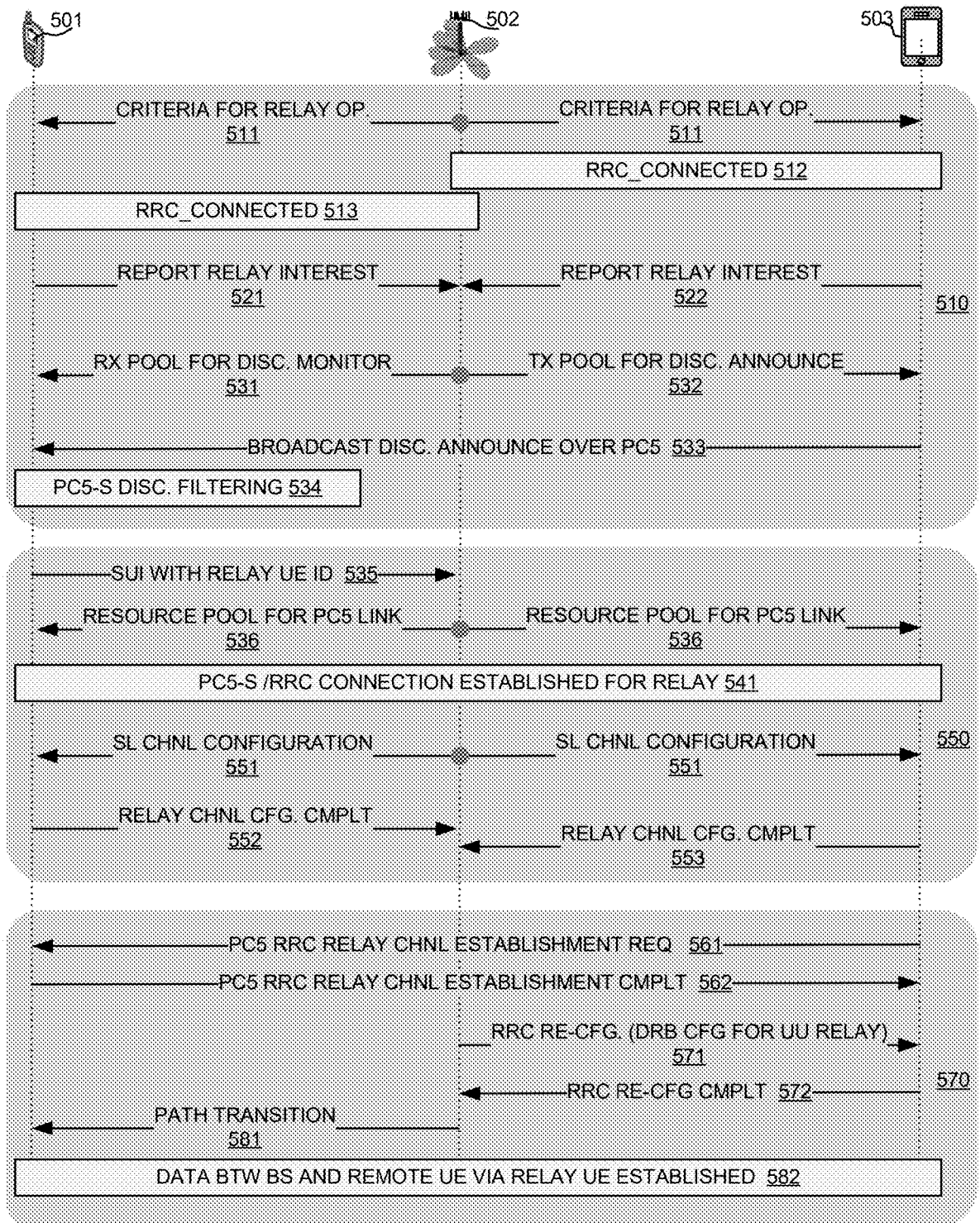
FIG. 5 illustrates an exemplary message flow diagram for the connection establishment of the UE-to-Network L2-based sidelink relay with the remote UE connected with the network in accordance with embodiments of the current invention.

FIG. 5 illustrates an exemplary message flow diagram for the connection establishment of the UE-to-network L2-based sidelink relay with the remote UE connected with the network in accordance with embodiments of the current invention. A remote UE 501 connects with the NR wireless network with a gNB 502. A relay UE 503 connects with gNB 502 with access link. The connection establishment of the L2-based sidelink relay path includes a sidelink discovery procedure 510, a sidelink channel establishment procedure 550, and an end-to-end sidelink relay activation procedure 570.

At step 511, gNB 502 broadcasts relay criteria to remote and relay UEs, including remote UE 501 and relay UE 502. At step 512, relay UE 503 enters RRC_CONNECTED state. At step 513, remote UE 501 enters RRC_CONNECTED state. At steps 521 remote 501 reports to gNB 502 its interest to transmit traffic via relaying as a remote UE when the criteria is met. At step 522, relay UE 503 reports to gNB 502 its interest to perform traffic relaying as a relay UE when the criteria is met. The sidelink discovery procedure includes a Mode-A procedure and a Mode-B procedure. Relay UE 503 and remote UE 501 performs sidelink discovery in either Mode-A or Mode-B. At step 532, gNB 502 sends TX pool information for discovery announcement to relay UE 503. Relay UE 503 is configured with TX resources, either for Mode-A or for Mode-B, to send Discovery Announcement after network authorization. If the relay UE is scheduled by Mode-B, the corresponding RX pool for the remote UE needs to be configured to the Remote UE at step 531 for Discovery monitoring. At step 531, gNB 502 sends RX pool information for discovery monitoring to remote UE 501. The remote UE 501 is configured with RX resources to monitor the Discovery Announcement after network authorization. The RX resources configured at Step 531 needs to be aligned with the TX pool configured to the relay UE 503 in Mode-B. The resource configuration to relay UE 503 and remote UE 501 are not synchronous. At step 533, the relay UE 503 broadcasts discovery announcement over PC5 with Application Code or Restricted Code configured at PC5-S according to the configured resources configured for the TX and/or RX pool. Relay UE 503 transmits physical sidelink control channel (PSCCH), the 1$^{st}$ SCI, and its corresponding physical sidelink shared channel (PSSCH) carrying Discovery announcement. At step 534, remote UE 501 monitors the announcement and take radio level RSRP/RSRQ measurements of the PC5 radio link quality. The RSRP/RSRQ measurement is taken on the DMRS of PSSCH of the sub-channel(s) within the resource. The PC5-S discovery filtering is performed based on the Application Code or Restricted Code. The discovery procedure completes if the Application Code or Restricted Code matches the filter.

At step 535, remote UE 501 sends the sidelink UE information (SUI) to the gNB 502 including remote UE ID, the discovered relay UE ID, and the request for relaying communication resource for both TX and RX. Step 535 is the triggering to transit from the discovery stage to the communication stage. In one embodiment, the link quality of the PC5 link between the relay UE and the remote is included in SUI. In one embodiment, he remote UE ID and the relay UE ID is the Layer 2 UE ID as defined by 3GPP TS 23.003. The SUI report clearly describes the pair of the remote UE and the relay UE, the role of both UEs and the Identities of both UEs. At step 536, as a response to the SUI message from the remote UE 501, gNB 502 configures the resource pool in either Mode-A or Mode-B, for both relay UE 503 and remote UE 501 to establish the PC5 unicast link for relaying. If the Relay UE and remote UE 501 is scheduled with Mode-B, the aligned resource pool for sensing for the UE pair needs to be provided via the configuration. Alternatively, step 531 and 532 configure the resources for both discovery and communication. At step 541, the PC5 unicast link is established between remote UE 501 and relay UE 503 for direct communication-based relaying, which is managed by PC5-S signaling. The direct PC5 unicast link is established based on a communication resource configured at step 536. The PC5-S connection between remote UE 501 and relay UE 503 is established. In one embodiment, when the PC5-S connection is established, an initial PC5 RRC connection is also established between remote UE 501 and relay UE 503. In one embodiment, the remote UE capability is reported to the relay UE over PC5. At step 551, gNB 502 sends the configuration to both remote UE 501 and relay UE 503 via Uu RRC message. In one embodiment, the RRC message is the RRC Reconfiguration message. The configuration includes the relaying channel configurations for the direct PC5 link between the relay UE and the remote UE. The relay channel configurations for the direct PC5 link includes the configuration for the radio link control (RLC) layer and the MAC layer. In one embodiment, the relay UE performs L2 Relay at the MAC layer. The channel configurations for the direct PC5 link includes the configuration for the MAC layer configuration, which includes the logical channel configuration including logical channel ID. In another embodiment, a relaying channel ID is configured. In another embodiment, the relay UE performs the L2 relay at an adaptation layer. The relay channel configurations for the direct PC5 link includes adaption layer configuration, RLC layer configuration and the configuration for the MAC layer configuration, which includes the logical channel configuration including logical channel ID. In another embodiment, a relaying channel ID is configured. To identify the relaying channel over direct link PC5, the logical channel ID may be used as the relaying channel ID. One or more specific logical channels over PC5 can be assigned for relaying purpose. In other embodiments, a specific relaying channel ID is defined. In this case, there is one-to-one mapping between logical channel ID and PC5 relaying channel ID. At steps 552 and 553, remote UE 501 and relay UE 503 respond a Sidelink Relay Channel configuration complete as an acknowledgment, respectively. In one embodiment, the message is a RRC Reconfiguration complete message. In one embodiment, the Sidelink Relay Channel configuration to remote UE 501 is omitted. Instead, gNB 501 instructs relay UE 503 in step 536 to execute the configuration of PC5 link between the remote UE and the relay UE. In this case, a PC5 RRC message is sent from the relay UE to notify the remote UE to establish the relay channel for relaying. In one embodiment, the PC5 RRC message is the Relay Channel Establishment Request through PC5. remote UE acknowledges relay UE with a PC5 RRC message Relay Channel Establishment complete.

In one embodiment, at step 561, relay UE 503 sends PC5 RRC relay channel establishment request to remote UE 501. At step 562, remote UE 501 replies with PC5 RRC relay channel establishment complete message. At step 571, gNB 502 sends an RRC Reconfiguration message to relay UE 503 to configure the additional radio bearers to prepare the traffic relaying for remote UE 501. At step 572, relay UE 503 acknowledges gNB 502 with an RRC message (RRC Reconfiguration Complete) to indicate that the completion of the preparation of Uu radio bearers for relaying. In another embodiment, gNB 502 configures both sidelink relay channel configuration and Uu radio bearers for relaying in one shot at step 536. At step 581, gNB 502 controls the switching from Uu Path to relaying path for remote UE 501. When there is an ongoing Uu data radio bearer (DRB), gNB 502 uses a relay end-marker PDCP control PDU to indicate the path transition from Uu, the direct path, to PC5-Uu, the indirect path. After the transition, the Uu RRC connection is kept between remote UE 501 and gNB 502 to allow the end-to-end L3 message delivery and data delivery. The active PC5 RRC connection between remote UE 501 and relay UE 503 is established to support the unicast PC5-S link. The relay end-marker PDCP control PDU is compiled by setting the LSN field to the PDCP SN of the last PDCP data PDU for which the PDCP SN has been associated, and submitting it to lower layers as the next PDCP PDU for the transmission after the PDCP Data PDU corresponding to LSN has been submitted to lower layers. After the relay end-marker PDCP control PDU is received by the remote UE, the PDCP entity starts receiving the DL data from the established RLC entity for PC5 link. Meanwhile, the UL data of the remote UE, such as the PDCP PDU, is sent to the RLC entity for PC5 link. The intention is to achieve service continuity during the switch from the direct Uu link to the indirect PC5-Uu for the data flow between BS and remote UE. At step 582, relay UE 503 forwards the traffic between gNB 502 and remote UE 501.

Figure 6:
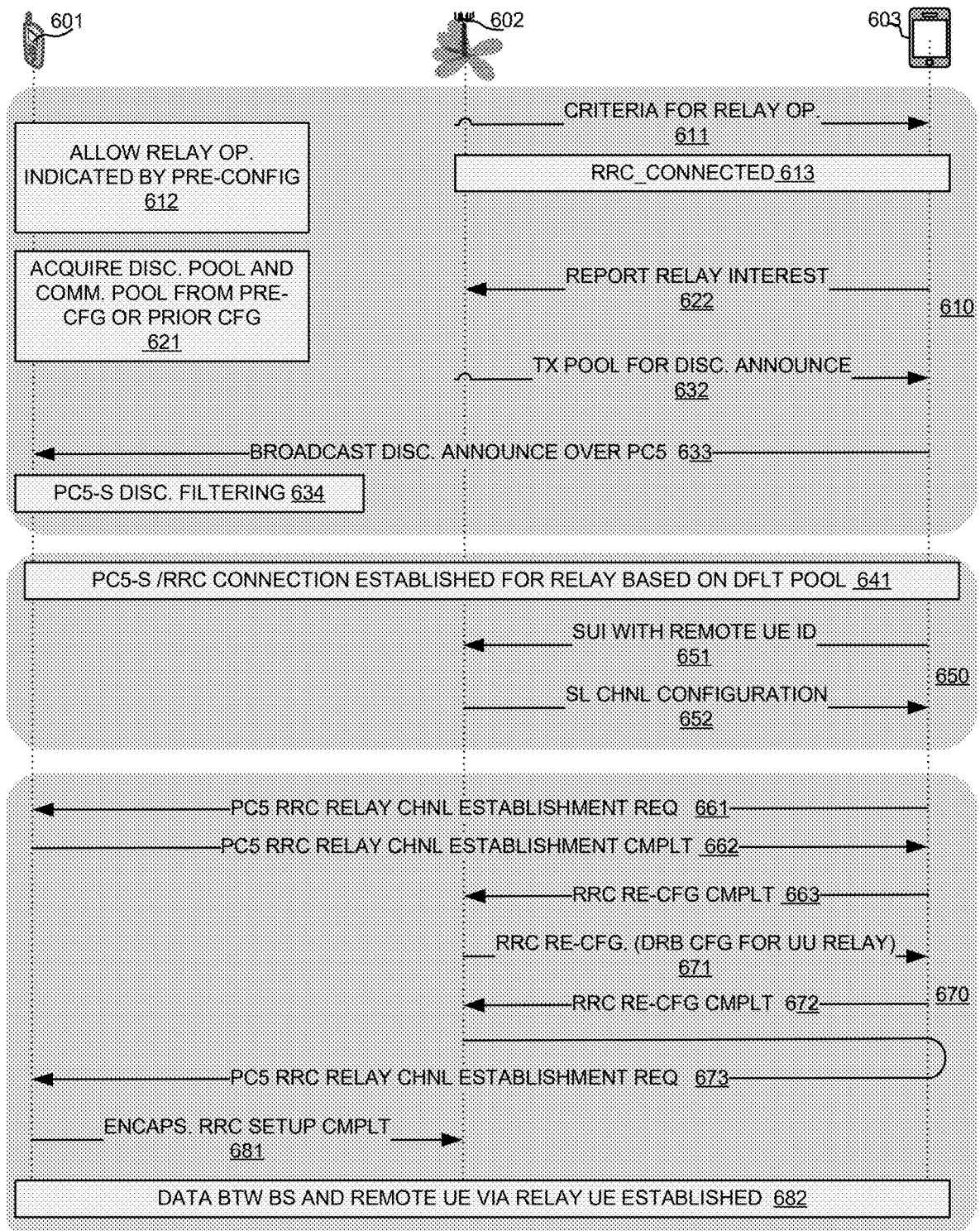
FIG. 6 illustrates an exemplary message flow diagram for the connection establishment of the UE-to-Network L2-based sidelink relay with the remote UE not connected with the network in accordance with embodiments of the current invention.

FIG. 6 illustrates an exemplary message flow diagram for the connection establishment of the UE-to-Network L2-based sidelink relay with the remote UE not connected with the network in accordance with embodiments of the current invention. The NR wireless network includes a remote UE 601, a gNB 602 and a relay UE 603. The remote UE 601 does not have a direct link with the gNB 602. The connection establishment of the L2-based sidelink relay path includes a sidelink discovery procedure 610, a sidelink channel establishment procedure 650, and an end-to-end sidelink relay activation procedure 670.

At step 611, gNB 502 broadcasts relay criteria to remote and relay UEs, including remote UE 501 and relay UE 502. At step 613, relay UE 603 enters RRC_CONNECTED state. At step 622, relay UE 603 reports to gNB 602 its interest to perform traffic relaying as a relay UE when the criteria is met. At step 612, an indicator of allowing relaying operation is indicated by pre-configuration, such as in USIM, or some other form of configuration at remote UE. The pre-configuration indicates the remote UE is authorized to perform relaying operation. The sidelink discovery procedure includes a Mode-A procedure and a Mode-B procedure. Relay UE 503 and remote UE 601 performs sidelink discovery in either Mode-A or Mode-B. At step 632, gNB 602 sends TX pool information for discovery announcement to relay UE 603. Relay UE 603 is configured with TX resources, either for Mode-A or for Mode-B, to send Discovery Announcement after network authorization. If the relay UE is scheduled by Mode-B, the corresponding RX pool for the remote UE needs to be configured to the remote UE at step 621 for Discovery monitoring. At step 621, remote UE 601 acquires discovery pool and communication pool from Pre-configuration or its previous configuration during RRC_Connected mode. At step 633, the relay UE 603 broadcasts discovery announcement over PC5 with Application Code or Restricted Code configured at PC5-S according to the configured resources configured for the TX and/or RX pool. At step 634, remote UE 601 monitors the discovery announcement and takes radio level RSRP/RSRQ measurements of the PC5 radio link quality. Meanwhile, the PC5-S discovery filtering is performed based on the Application Code or Restricted Code. The Discovery procedure for the Remote UE completes if the corresponding Application Code or Restricted Code matches the corresponding filter.

At step 641, the direct PC5 unicast link is established between remote UE 601 and relay UE 603 for UE-to-Network based relaying, which is managed by PC5-S signaling. The direct PC5 unicast link is established based on a default communication resource pool. For example, remote UE 601 and relay UE 603 can use a configured exception resource pool to establish the PC5 unicast link. The PC5-S connection between remote UE 601 and relay UE 603 is established. When the PC5-S connection is established, an initial PC5 RRC connection is also established implicitly. Remote UE 601 reports its UE capability to relay UE 603 over the PC5. In one embodiment, subsequently, remote UE 601 sends relaying service request to relay UE at NAS layer (i.e. PC5-S). The PC5-S layer of relay UE interacts with RRC layer for the request and triggers the relay UE to send an SUI message to gNB 602 as in step 651. At step 651, relay UE 603 sends the SUI RRC message to gNB 602 including the relay UE ID, the remote UE ID of remote UE 601, and the request for relaying communication resource (both TX and RX). In one embodiment, the PC5 link quality for the sidelink between remote UE 601 and relay UE 603 is included in SUI. In one embodiment, the remote UE ID and relay UE ID is the Layer-2 UE ID as defined by 3GPP TS 23.003. The SUI report clearly describes the Remote UE-Relay UE pair, the role of both UEs and the Identities of both UEs. In one embodiment, relay UE 603 reports the Remote UE capability including the supported frequency list and/or its own capability to the gNB 602 to get the appropriate resources for the follow-up relaying operation between remote UE 601 and gNB 602. At step 652, as a response to the SUI message from the relay UE, gNB 602 configures Sidelink Relay Channel configuration to relay UE 602 with the intention to establish the necessary relaying channel(s) to perform relaying between remote UE 601 and gNB 602. gNB 602 configures the resource pool in (either Mode-A or Mode-B) for both the relay UE and the remote UE to reconfigure the PC5 unicast link between relay UE 602 and remote UE 601 for relaying. If the relay UE and the remote UE are scheduled by at Mode-B, the aligned resource pool for sensing for the two UE pairs needs to be provided via the configuration. In other embodiment, step 632 configures the resources for both discovery and communication. gNB 602 provides the relaying channel configurations to relay UE via Uu RRC message (e.g. RRC Reconfiguration). In one embodiment, the configuration provided by gNB 602 includes not only the relaying channel configurations for the direct PC5 links between Relay UE and Remote UE, but also the Uu Radio Bearer configuration for indirect link between BS and Remote UE. The relaying channel configurations for the direct PC5 link includes the configuration for RLC and MAC (i.e. logical channel configuration including logical channel ID). In one embodiment, a relaying channel ID is configured. The Uu Radio Bearer configuration includes the configuration for SDAP and PDCP, and end-to-end sidelink radio bearer (SLRB) ID. In one embodiment, the relay UE performs the L2 sidelink relay at the MAC layer. The relaying channel configurations for the direct PC5 link includes the configuration for MAC (i.e. logical channel configuration including logical channel ID). A relaying channel ID is optionally configured. The Uu Radio Bearer configuration includes the configuration for SDAP, PDCP and RLC, and end-to-end SLRB ID. In another embodiment, the relay UE performs the L2 sidelink relay at an adaptation layer, the relaying channel configurations for the direct PC5 link includes the configuration for MAC (i.e. logical channel configuration including logical channel ID), RLC and adaptation layer. A relaying channel ID is optionally configured. The Uu Radio Bearer configuration includes the configuration for SDAP and PDCP, and end-to-end SLRB ID. In one embodiment, to identify the relaying channel over direct link PC5, the logical channel ID is used as relaying channel ID. In one embodiment, the relay UE assigns one or more specific logical channels over PC5 for relaying purpose. In another embodiment, a specific relaying channel ID is defined. In this case, there is one to one mapping between logical channel ID and PC5 relaying channel ID.

At step 661, relay UE 602 applies the relay channel configuration and sends the corresponding Relay channel establishment request (PC5 RRC message) to remote UE 601 to establish the PC5 relay channel for relaying. In one embodiment, relay UE 602 also carries the Uu Radio Bearer configuration in the PC5 RRC message of the Relay channel establishment request is included. At step 662, remote UE 601 acknowledges the relay UE 602 via PC5 RRC message Relay channel establishment complete. In one embodiment, remote UE 601 also carries the acknowledgement for the Uu Radio Bearer configuration in the same PC5 RRC message of the Relay channel establishment complete. In one embodiment, at step 663 relay UE 603 responds a Sidelink configuration complete (e.g. in RRC Reconfiguration complete) as an acknowledgement of the configuration to the gNB 602. In one embodiment, relay UE 603 also carries the Uu Radio Bearer configuration complete in the Uu RRC message of the RRC Reconfiguration complete. At step 671, gNB 602 sends a RRC Reconfiguration message to relay UE 603 to configure the additional radio bearers to prepare the traffic relaying for remote UE 601. At step 672, relay UE 603 acknowledges gNB 602 with an RRC message (RRC Reconfiguration Complete) to indicate that he already completes the preparation of Uu radio bearers for relaying. In another embodiment, gNB 602 configures both sidelink relay channel configuration and Uu radio bearers for relaying in one shot. At step 673, gNB 602 sends an encapsulated Uu RRC message, the RRC Setup Request, to remote UE 601, which is transparently forwarded by relay UE 603. The RRC Setup Request message configures the Uu Radio Bearer configuration for indirect link between gNB 602 and remote UE 601. The Uu Radio Bearer configuration includes the configuration for SDAP and PDCP, and end-to-end Uu Radio Bearer ID. In one embodiment, the Uu Radio Bearer configuration includes the configuration for SDAP, PDCP and RLC, and end-to-end Uu Radio Bearer ID. In one embodiment, the Uu Radio Bearer configuration includes the configuration for SDAP, PDCP and an adaptation layer, and end-to-end Uu Radio Bearer ID. At step 681, remote UE 601 sends an encapsulated Uu RRC message, the RRC Setup Complete, to gNB 602 transparently forwarded by relay UE 603. The RRC Setup Complete message is an acknowledgement of RRC connection establishment request between remote UE 601 and gNB 602. At step 682, relay UE 603 transparently forwards traffic between remote UE 601 and gNB 602.

In one novel aspect, bearer mapping is performed at the relay UE for traffic forwarding using the L2-based sidelink relay.

Figure 7:
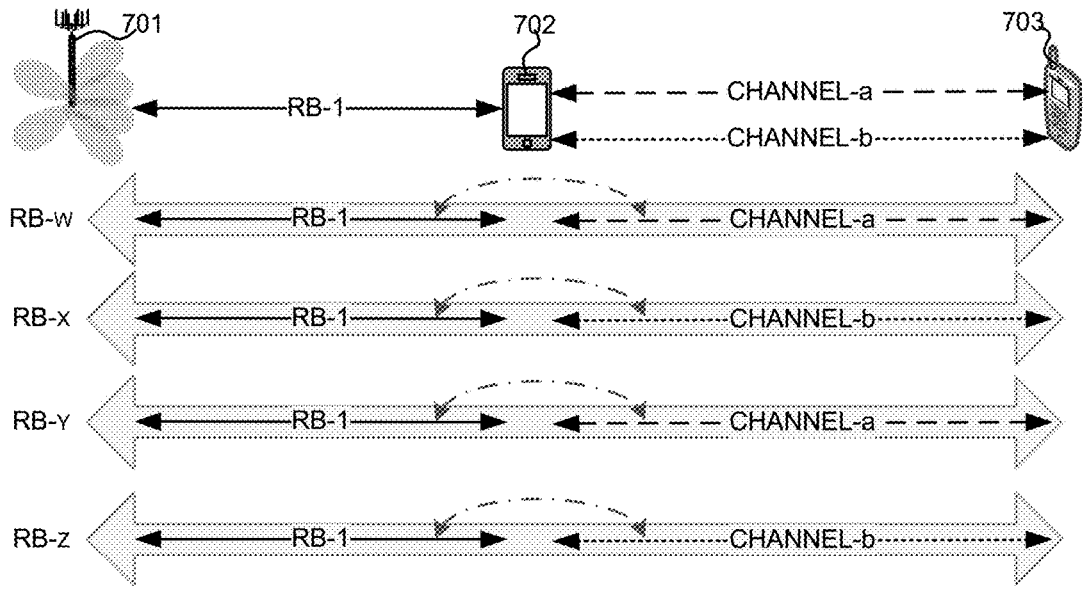
FIG. 7 illustrates exemplary diagrams of bearer mapping for L2-based sidelink relay at the relay UE and an exemplary bearer mapping table in accordance with embodiments of the current invention.

FIG. 7 illustrates exemplary diagrams of bearer mapping for L2-based sidelink relay at the relay UE and an exemplary bearer mapping table in accordance with embodiments of the current invention. The exemplary L2-based sidelink relay path is established between gNB 701 and remote UE 703 via a relay UE 702. There is on Uu RB, RB-1, for relay configured between gNB 701 and relay UE 702. There are two relay channels, Channel-a and Channel-b configured for the relay between relay UE 702 and remote UE 703. The four end-to-end RB, RB-w, RB-x, RB-y, and RB-z, for relay between remote UE 703 and gNB 701 are configured and mapped to the relay channels and the Uu RBs. Table 700 of Table-1 illustrates the mapping relation.

Remote UE 703 maintains the identities of the established end-to-end Uu radio bearers according to Uu RRC message exchange with gNB 701. Remote UE 703 also maintains the identity of relay channel between remote UE 703 and relay UE 702 for each Uu radio bearer according to step 536. The mapping relation between end-to-end Uu Bearer ID and Relay channel ID is kept at the remote UE. One to many or one to one mapping is supported. Relay UE 702 maintains the ID of the established Uu radio bearers for relaying according to Uu RRC message exchange with the gNB 701. Relay UE 702 also maintains the ID of relay channel between remote UE 703 and relay UE 702 for each Uu radio bearer for relaying based on step 536 and/or step 561. The mapping relation between Uu Bearer ID of mapped radio bearer for relaying and Relay channel ID is kept at relay UE 702. One to many or one to one mapping is supported. One to many or one to one mapping is supported among the radio bearers among single remote UE or multiple remote UEs. To identify the radio bearer for different remote UE, a combination of remote UE ID, Uu Bearer ID of mapped radio bearer for relaying and Relay channel ID is used. gNB 701 maintains the identities of the established Uu radio bearers for relaying with the relay UE(s). gNB 701 also maintains the identities of the established end-to-end Uu radio bearers with the remote UE(s). The mapping relation between Uu Bearer ID of mapped radio bearer for relaying (with relay UE) and Uu Bearer ID of end-to-end radio bearers (with remote UE) is kept at gNB 701. One to many or one to one mapping is supported among the radio bearers among single remote UE or multiple remote UE. To identify the radio bearer for different remote UEs, a combination of Remote UE ID, Uu Bearer ID of mapped radio bearer for relaying and Uu Bearer ID of end-to-end radio bearers is used.

As shown in Table-1, there are multiple mapping relations. There are four end-to-end radio bearers configured between the gNB and the remote UE (i.e. RB-w, RB-x, RB-y and RB-z). There are two relaying channels configured between the relay UE and the remote UE (i.e. Channel-a and Channel-b). There is one Uu radio bearer configured relaying between the relay UE and the gNB (i.e. Channel-1). Both end-to-end RB-w and RB-y are mapped to Channel-a between the relay UE and the remote UE. Both end-to-end RB-x and RB-z are mapped to Channel-b between the relay UE and the remote UE. All the end-to-end RBs are mapped to Channel-1 between the gNB and the relay UE.

Figure 8:
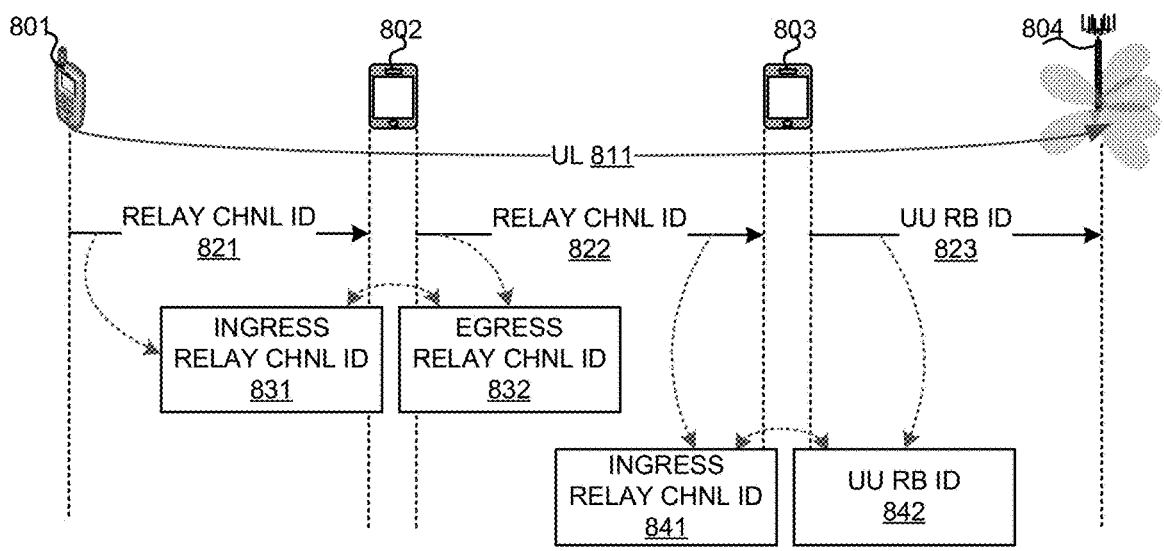
FIG. 8 illustrates exemplary diagrams of bearer mapping for a multi-hop L2-based sidelink relay in accordance with embodiments of the current invention.

FIG. 8 illustrates exemplary diagrams of bearer mapping for a multi-hop L2-based sidelink relay in accordance with embodiments of the current invention. An exemplary two-hop relay path includes a remote UE 801, a first relay UE 802, a second relay UE 803, and a gNB 804. An uplink end-to-end relay path 811 is established between the remote UE 801 and the gNB 804. A relay channel 821 is established between remote UE 801 and first relay UE 802. A relay channel 822 is established between first relay UE 802 and second relay UE 803. A Uu RB is established between second relay UE 803 and gNB 804. During uplink data transmission, first relay UE 802 maps relaying channel ID of relay channel 821 with an ingress relay channel ID 831 to a relaying channel ID for relay channel 822 of its egress-relaying channel ID 832 during bearer mapping for traffic forwarding. Similarly, second relay UE 803 maps relaying channel ID of relay channel 822 with an ingress relay channel ID 841 to a Uu RB ID 842 for Uu RB 823 of its egress-relaying channel ID during bearer mapping for traffic forwarding. The exemplary UL bearer mapping applies similarly to DL traffic forwarding. Similarly, the two-hop bearer mapping applies to multi-hop bearer mapping for L2-based sidelink relay.

Figure 9:
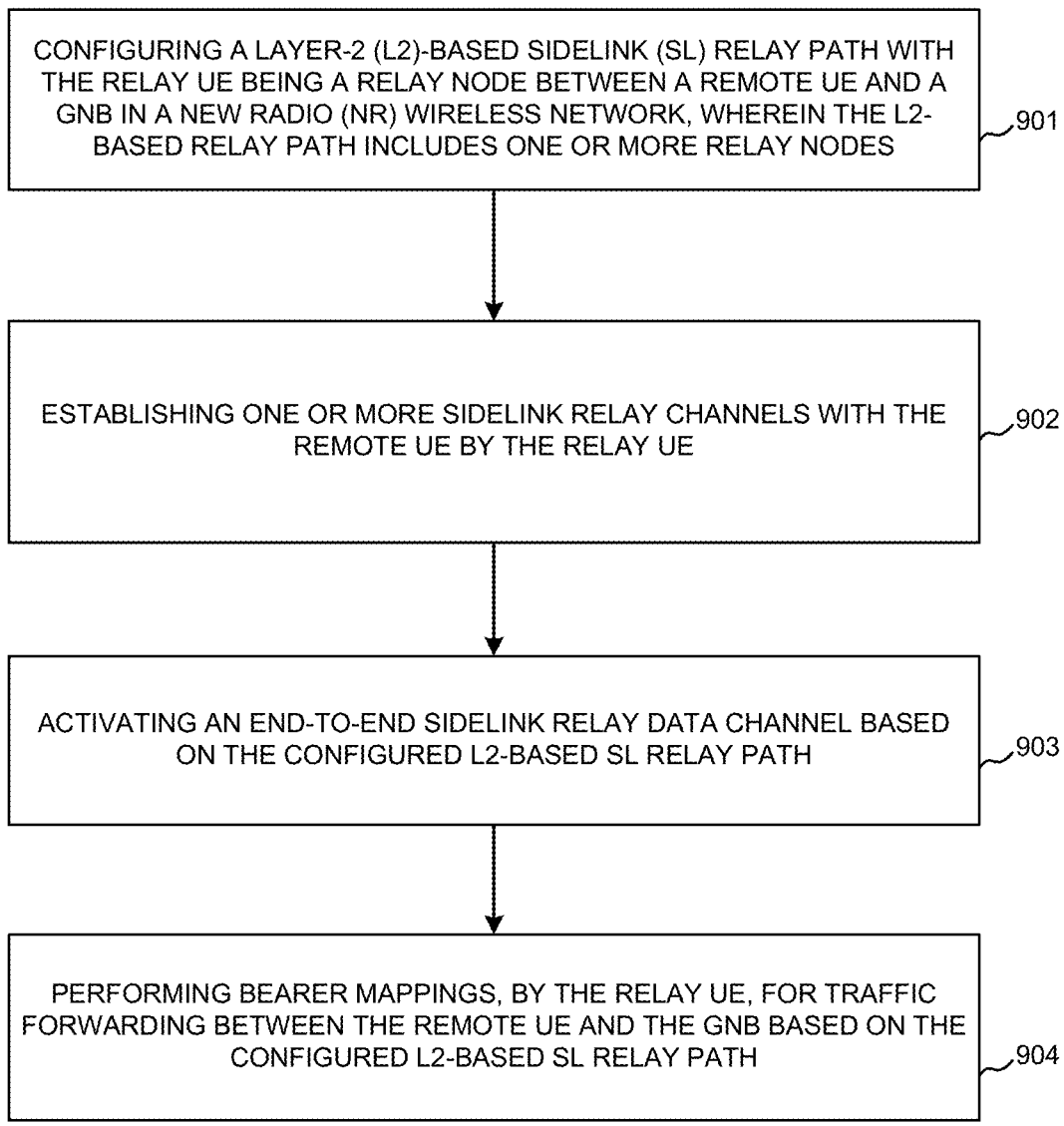
FIG. 9 illustrates an exemplary relay UE flow chart of the connection establishment and bearer mapping for L2-based sidelink relay in accordance with embodiments of the current invention.

FIG. 9 illustrates an exemplary relay UE flow chart of the connection establishment and bearer mapping for L2-based sidelink relay in accordance with embodiments of the current invention. At step 901, the relay UE configures an L2-based SL relay path with the relay UE being a relay node between a remote UE and a gNB in a new radio (NR) wireless network, wherein the L2-based relay path includes one or more relay nodes. At step 902, the relay UE establishes one or more sidelink relay channels with the remote UE. At step 903, the relay UE activates an end-to-end sidelink relay data channel based on the configured L2-based SL relay path. At step 904, the relay UE performs bearer mappings for traffic forwarding between the remote UE and the gNB based on the configured L2-based SL relay path.

Figure 10:
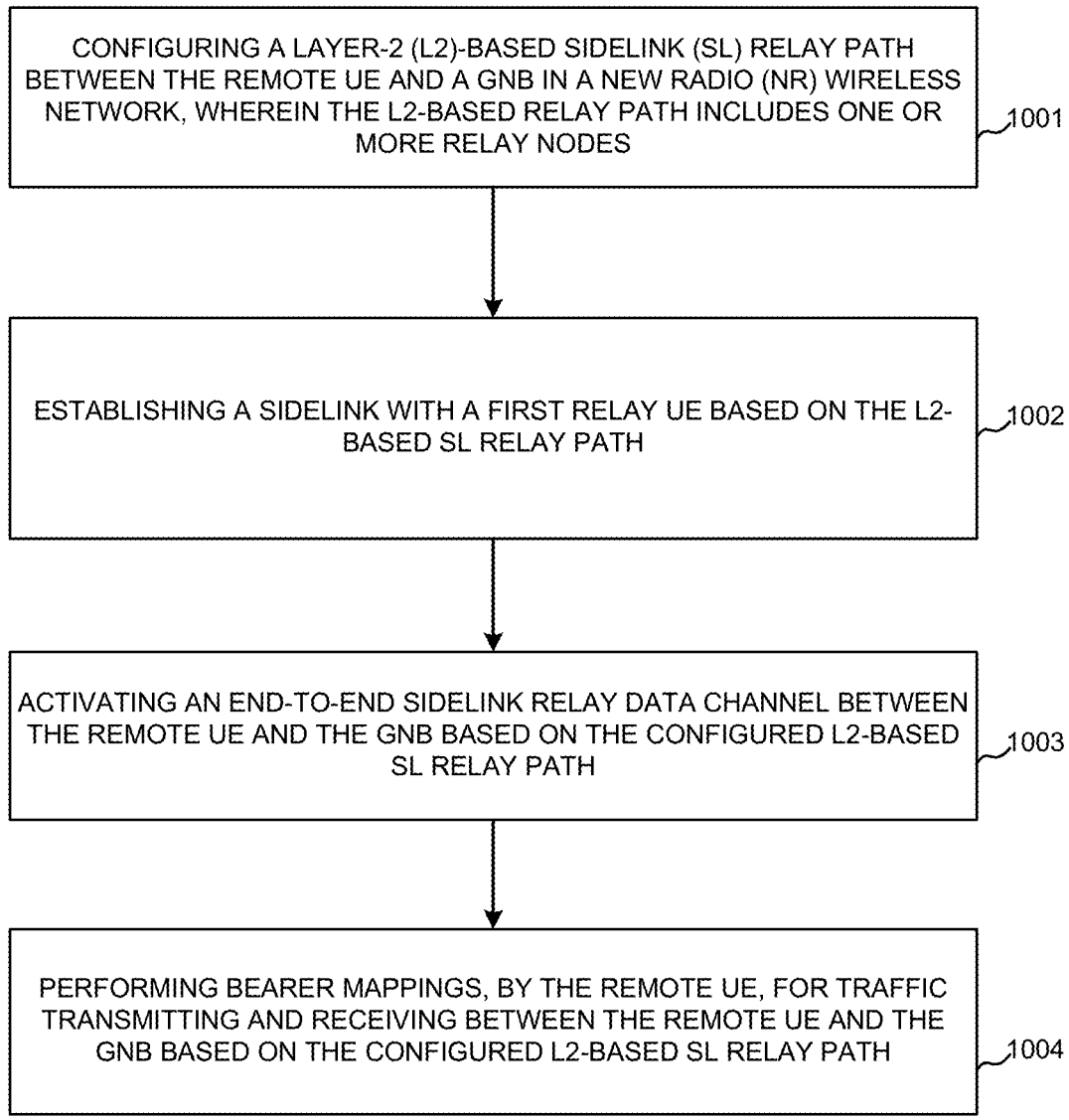
FIG. 10 illustrates an exemplary remote UE flow chart of the connection establishment and bearer mapping for L2-based sidelink relay in accordance with embodiments of the current invention.

FIG. 10 illustrates an exemplary remote UE flow chart of the connection establishment and bearer mapping for L2-based sidelink relay in accordance with embodiments of the current invention. At step 1001, the remote UE configures an L2-based SL relay path between the remote UE and a gNB in a new radio (NR) wireless network, wherein the L2-based relay path includes one or more relay nodes. At step 1002, the remote UE establishes a sidelink with a first relay UE based on the L2-based SL relay path. At step 1003, the remote UE activates an end-to-end sidelink relay data channel between the remote UE and the gNB based on the configured L2-based SL relay path. At step 1004, the remote performs bearer mapping for traffic transmitting and receiving between the remote UE and the gNB based on the configured L2-based SL relay path.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for a relay user equipment (UE) comprising:
configuring a layer-2 (L2)-based sidelink (SL) relay path with the relay UE being a relay node between a remote UE and a gNB in a new radio (NR) wireless network, wherein the L2-based relay path includes one or more relay nodes;
establishing one or more sidelink relay channels with the remote UE by the relay UE;
activating an end-to-end sidelink relay data channel based on the configured L2-based SL relay path; and
performing bearer mappings, by the relay UE, for traffic forwarding between the remote UE and the gNB based on the configured L2-based SL relay path, wherein the bearer mapping associates an end-to-end Uu bearer ID of the end-to-end sidelink relay data channel with a relay channel ID.

2. The method of claim 1, wherein the establishing of one or more sidelink relay channels is triggered by a Uu radio resource control (RRC) message of Sidelink Relay Channel Configuration Request from the gNB.

3. The method of claim 2, wherein the Sidelink Relay Channel Configuration Request message configures a direct PC5 link between the relay UE and the remote UE.

4. The method of claim 2, wherein the Sidelink Relay Channel Configuration Request message configures a direct PC5 link between the relay UE and the remote UE and a Uu radio bearer configuration for indirect link between the gNB and the remote UE.

5. The method of claim 4, wherein the relay UE sends a PC5 RRC message of Sidelink Relay Channel Configuration Request to the remote UE based on the Uu RRC message from the gNB.

6. The method of claim 1, wherein the relay UE sends a sidelink UE information (SUI) to the gNB with UE information for both the relay UE and the remote UE.

7. The method of claim 1, wherein the relay UE establishes a first sidelink with the remote UE and a second sidelink with a second relay UE, and wherein the relay UE maps its ingress relay channel between the remote UE and the second relay UE to its egress relay channel between the relay UE and the second relay UE.

8. A method for a remote user equipment (UE) comprising:
configuring a layer-2 (L2)-based sidelink (SL) relay path between the remote UE and a gNB in a new radio (NR) wireless network, wherein the L2-based relay path includes one or more relay nodes;
establishing a sidelink with a first relay UE based on the L2-based SL relay path;
activating an end-to-end sidelink relay data channel between the remote UE and the gNB based on the configured L2-based SL relay path; and
performing bearer mappings, by the remote UE, for traffic transmitting and receiving between the remote UE and the gNB based on the configured L2-based SL relay path, wherein the bearer mapping associates an end-to-end Uu bearer ID of the end-to-end sidelink relay data channel with a relay channel ID.

9. The method of claim 8, wherein the establishing of the sidelink is triggered by a Uu radio resource control (RRC) message of Sidelink Relay Channel Configuration Request from the gNB.

10. The method of claim 8, wherein the establishing of the sidelink is triggered by a PC5 RRC message of Sidelink Relay Channel Configuration Request from the relay UE.

11. The method of claim 8, wherein the remote UE establishes a Uu direct link with the gNB, and wherein a radio bearer switch message is received from the gNB to switch from the Uu direct link with the gNB to an end-to-end sidelink relay bearer.

12. A user equipment (UE), comprising:
- a transceiver that transmits and receives radio frequency (RF) signal in a new radio (NR) wireless network;
- a sidelink (SL) relay circuit that configures a layer-2 (L2)-based sidelink (SL) relay path between a remote UE and a gNB in the NR wireless network, wherein the L2-based relay path includes one or more relay nodes;
- a relay channel circuit that establishes one or more sidelink relay channels based on the L2-based SL relay path;
- a relay path circuit that activates an end-to-end sidelink relay data channel based on the configured L2-based SL relay path; and
- a bearer mapping circuit that performs bearer mappings for traffic forwarding between the remote UE and the gNB based on the configured L2-based SL relay path, wherein the bearer mapping associates an end-to-end Uu bearer ID of the end-to-end sidelink relay data channel with a relay channel ID.

13. The UE of claim 12, wherein the establishing of one or more sidelink relay channels is triggered by a Uu radio resource control (RRC) message of Sidelink Relay Channel Configuration Request from the gNB.

14. The UE of claim 13, wherein the Sidelink Relay Channel Configuration Request message configures a direct PC5 link between the UE and the remote UE.

15. The UE of claim 13, wherein the Sidelink Relay Channel Configuration Request message configures a direct PC5 link between the UE and the remote UE and a Uu radio bearer configuration for indirect link between the gNB and the remote UE.

16. The UE of claim 15, wherein the UE sends a PC5 RRC message of Sidelink Relay Channel Configuration Request to the remote UE based on the Uu RRC message from the gNB.

17. The UE of claim 12, wherein the UE establishes a first sidelink with the remote UE and a second sidelink with a second relay UE, and wherein the UE maps its ingress relay channel between the remote UE and the second relay UE to its egress relay channel between the UE and the second relay UE.

* * * * *